Jan. 13, 1953     E. W. HOUGHTON     2,625,589
SYSTEM FOR MEASURING PHASE AND GAIN
Filed Sept. 27, 1945     4 Sheets-Sheet 1
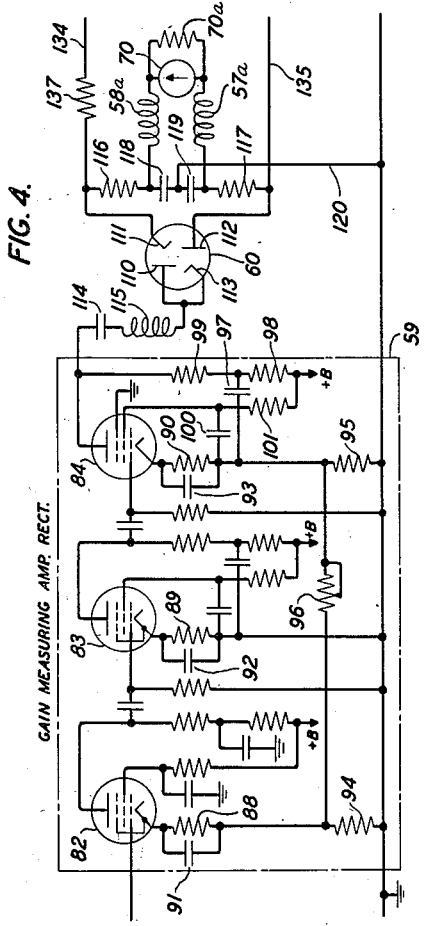
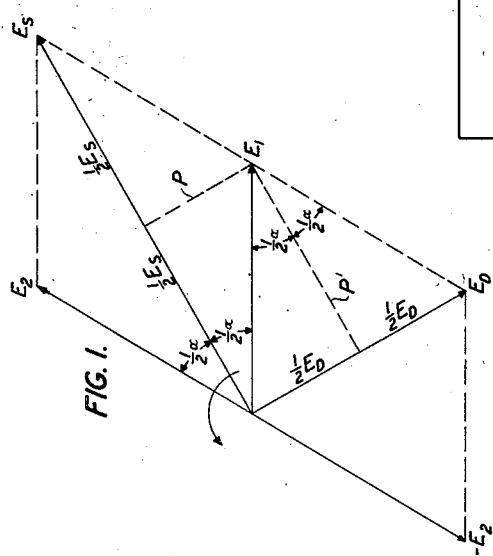
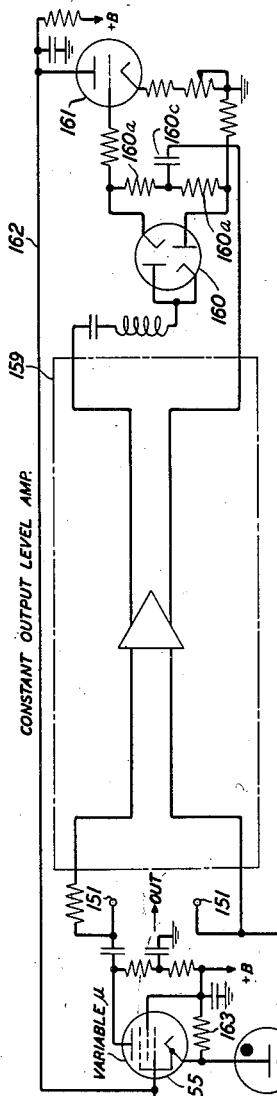
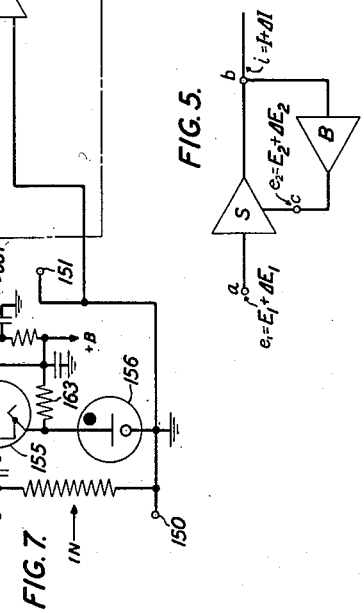
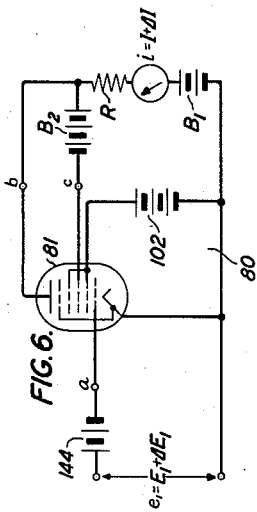
INVENTOR
E. W. HOUGHTON
BY
ATTORNEY INVENTOR
E. W. HOUGHTON
BY B. G. Cegen
ATTORNEY Jan. 13, 1953  E. W. HOUGHTON  2,625,589
SYSTEM FOR MEASURING PHASE AND GAIN
Filed Sept. 27, 1945  4 Sheets-Sheet 4

INVENTOR
E. W. HOUGHTON
BY:
B. C. Cager
ATTORNEY

Patented Jan. 13, 1953

2,625,589

UNITED STATES PATENT OFFICE 2,625,589

SYSTEM FOR MEASURING PHASE AND GAIN

Edward W. Houghton, Chatham, N. J., assignor to Bell Telephone Laboratories, Incorporated, New York, N. Y., a corporation of New York Application September 27, 1945, Serial No. 618,971

15 Claims. (Cl. 175—183)

This invention relates to measuring systems.

Objects of the invention are to measure phase difference and transmission gain and loss.

As brought out for example in the paper on Regeneration Theory and Experiment, by Peterson, Kreer and Ware, Proceedings of the Institute of Radio Engineers, October 1934, the stability of feedback amplifiers is dependent upon well-known requirements of phase shift and gain around the feedback loop or $\mu\beta$ path over a wide frequency range. In the case of certain commercial carrier amplifiers it is necessary to consider the range from 200 cycles to 3 megacycles, for example. With earlier phase angle measuring sets it took a great many hours of data taking and curve plotting work to completely explore the phase angle margin of such an amplifier.

In one specific aspect the invention is an automatic recording phase angle measuring set which shortens such work. This set measures the insertion phase shift and the insertion gain or loss, of a circuit to be tested, in a continuous sweep over the desired frequency range instead of on a point by point basis. A constant output-level oscillator with motor driven frequency varying means may be used as a source of signal testing voltage that sweeps through the frequency range. Two recorders with strip charts are provided to record in degrees and decibels the excursions, over the frequency range, of phase and gain. The set is also equipped with two indicating meters calibrated to indicate the phase shift in degrees and the gain or loss in decibels.

In accordance with the invention, the signal or testing voltage is applied to a path including the circuit to be tested, and to a reference path whose phase shift equals (or bears a known relation to) that of the first path minus the amount of the phase shift to be measured, and there are provided means responsive to the amplitudes of the output voltages from these paths for maintaining the output voltage of each of these paths at the same constant amplitude, means for obtaining the sum and the difference of these output voltages of equal constant amplitudes, means for separately rectifying the sum and difference voltages, and means for differentially combining the rectified quantities to obtain a resultant that is very nearly linearly proportional to the phase difference between the output voltages of equal constant amplitudes, for values of this phase difference that lie between zero and 180°, and is the same for any given value of this phase difference lying between zero and 180° as for a value of this phase shift equal to 360° minus the given value.

This resultant can operate an indicating or recording meter suitably calibrated to show the phase difference in degrees, the meter scale covering a range from zero to 180° and being very nearly linear over the range (i. e., being graduated very nearly uniformly). Assuming the phase difference to change gradually from zero to 180° and then from 180° to 360°, the meter pointer moves from the zero end of the scale to the 180° end and then back to the other end. Thus this measurement of the phase angle between the equal constant amplitude output voltages gives the same result regardless of which voltage leads the other. To remove the consequent ambiguity, in accordance with a feature of the invention, means is provided for in effect momentarily adding manually or automatically, a small amount, for example 5°, of phase shift of given sign, to the phase shift of the circuit under test. This momentary change of phase shift produces a momentary small change in one direction or the other in the position of the phase angle meter pointer, according to whether the phase shift of the circuit under test lies between zero and 180° or between 180° and 360°. The direction of this change in pointer position determines, therefore, the quadrant of the phase angle.

In accordance with a feature of the invention, the transmission-frequency band of the two above-mentioned paths to which the test voltage is applied (i. e., the path including the circuit to be tested and the reference path), and likewise the transmission-frequency band of the means for obtaining the sum wave and the difference wave, and the transmission-frequency band of the sum and difference rectifiers (and any associated amplifiers), includes the wide frequency range of the test voltage from the constant output level oscillator.

Since the level of the signal or test voltage at the input of the path including the circuit to be tested is constant, the transmission (gain or loss) through that circuit can be determined by measuring its output signal level with a gain measuring amplifier-rectifier equipped with a known type of indicating output meter calibrated in decibels on a linear scale. In accordance with a feature of the invention, to extend the range of the meter, there is provided means, as for example an attenuator operated by a motor in response to change in output level of this amplifier-rectifier, to change the input level of the amplifier-rectifier in discrete steps of known amount (as for example 10 decibels each) whenever the output level of the amplifier-rectifier either exceeds or falls below the range of the meter. Therefore, in determining the gain of the circuit under test, account must be taken of the resting position of the attenuator as well as of the meter reading. A feature of the invention relates to a lamp indicator including a system of lamps to facilitate taking into account the resting position of the attenuator and the setting of other adjustable loss-inserting range control devices referred to hereinafter.

It is desirable that the decibel scale of the gain record be a uniformly graduated scale. Therefore, the input circuit for the meter movement of the gain recorder includes a logarithmic amplifier or amplitude converter, which is an electronic device whose output amplitude is linearly proportional to the logarithm of its input amplitude. A feature of the invention is an improved form of logarithmic converter.

Other objects, aspects and features of the invention will be apparent from the following description and claims.

Fig. 1 is a vector diagram for facilitating explanation of the invention;

Figs. 2 and 3 together, with Fig. 3 at the right of Fig. 2, form a schematic circuit diagram of a broad-band automatic recording gain and phase shift measuring system embodying a form of the invention;

Fig. 4 shows the circuit of a gain measuring amplifier-rectifier indicated in Fig. 2;

Fig. 5 is a block schematic and Fig. 6 is a simplified circuit diagram of a logarithmic converter indicated in Fig. 2;

Fig. 7 is a circuit diagram of one of two like constant output level amplifiers indicated in Fig. 2.

Figure 2:
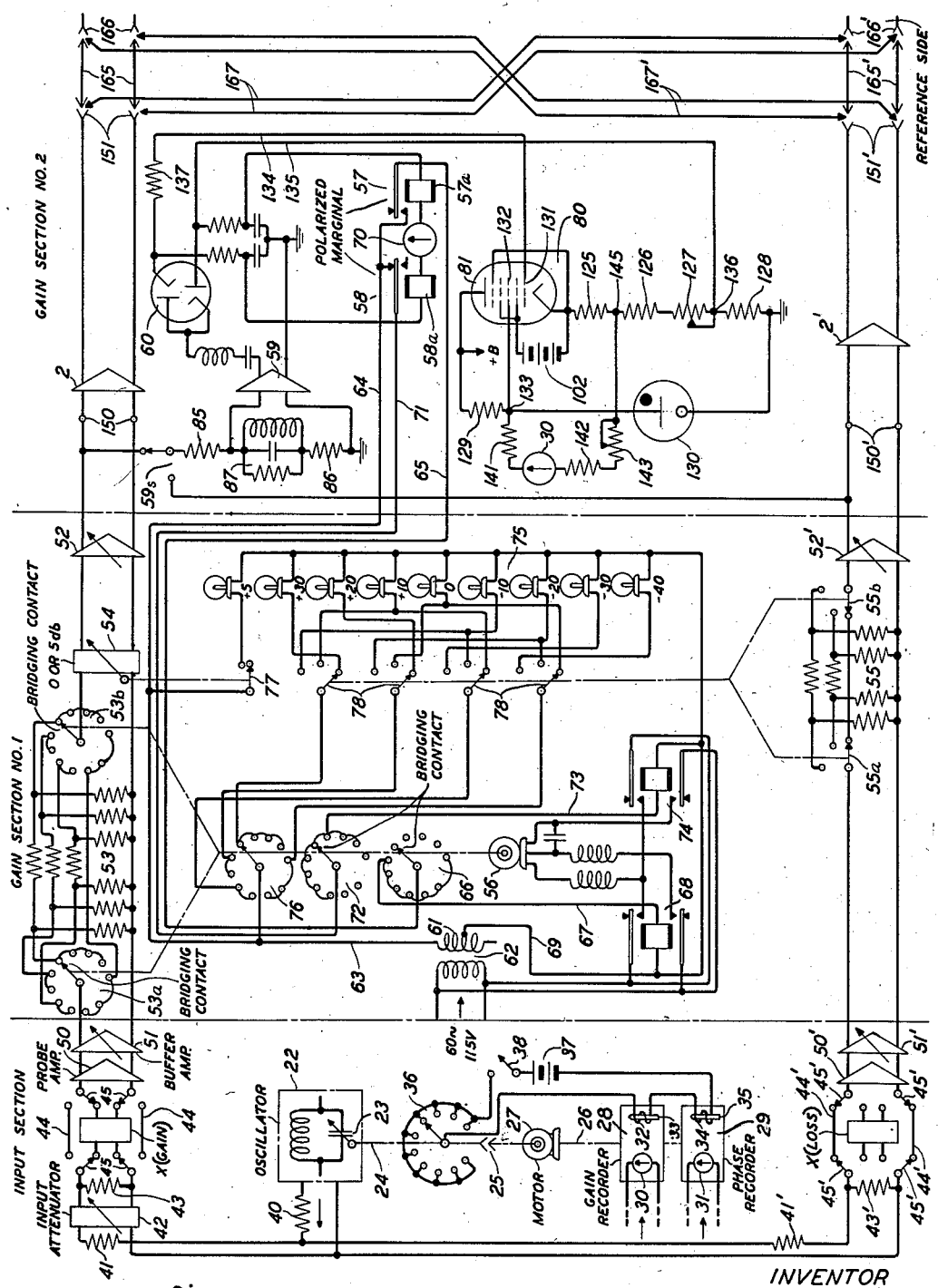
Figure 3:
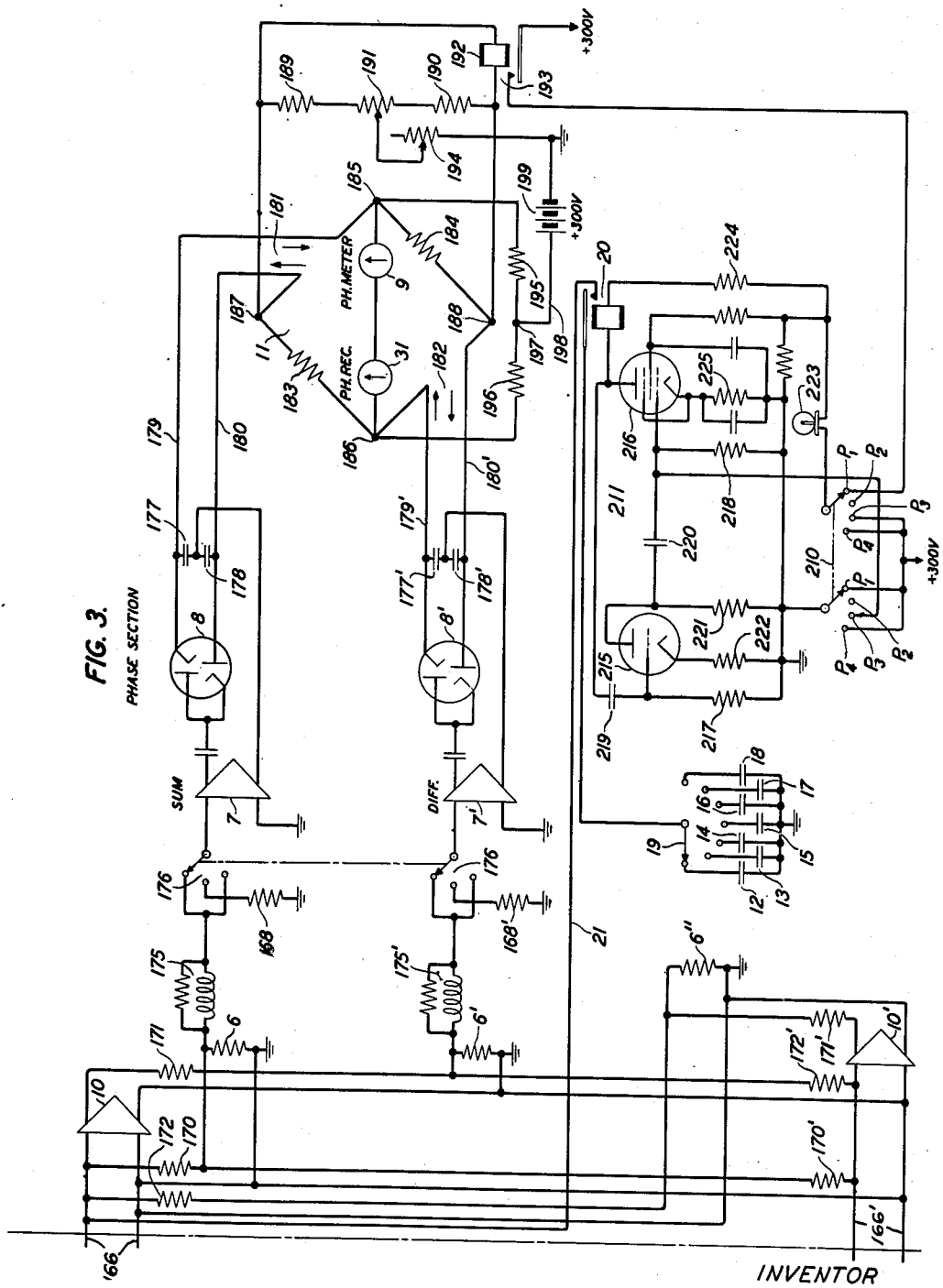

For measuring the voltage phase shift of a path, i. e., the phase difference between the input and output voltages of the path, for example the path X in Fig. 2, the system of Figs. 2 and 3 uses the principle that, as is apparent from Fig. 1, the magnitude of the sum of two voltage vectors equal in amplitude is proportional to the cosine of one-half the angle between them. In the vector diagrams of Fig. 1 vectors $E_1$ and $E_2$ are equal in amplitude and include an angle $\alpha$. If a perpendicular P be projected on $E_s$ from the tip of vector $E_1$, it is seen that $$\cos \tfrac{1}{2}\alpha = \frac{\tfrac{1}{2}E_s}{E_1} \text{ or } E_s = 2E_1 \cos \tfrac{1}{2}\alpha$$

That is, the vector sum $E_s$ of two equal vectors is a function of ½ of their included angle. $E_1$ may represent the input voltage and $E_2$ the output voltage of path X whose voltage phase shift is to be measured. $E_1$ may be considered a reference voltage, and $\alpha$ may be considered the phase angle by which $E_2$ differs from $E_1$. Means including broad-band amplifiers 2 and 2' of constant output level, indicated in Fig. 2, are used to obtain from these two voltages two voltages of the same phase difference whose magnitudes equal each other. These two equal magnitude voltages are combined by means comprising a sum resistor 6 shown in Fig. 3, amplified in broad-band sum amplifier 7, and rectified in a broad-band rectifier 8 shown in Fig. 3, the output current being proportional to the product of $2E_1 \cos \tfrac{1}{2}\alpha$. The direct current could be read as an angle on a suitably calibrated scale of a direct current milliammeter, such for instance as the indicating phase meter 9. Such a calibration, however, would result in the very non-uniform scale of a cosine function.

To obtain a more uniform scale, use is made of the fact that the algebraic difference of a sine and cosine function results in a very nearly linear scale for values of $\alpha$ between 0° and 180°. The sine function voltage is derived from $E_1$ and $E_2$ by means including a phase inverting amplifier 10, difference resistor 6', difference amplifier 7' and difference rectifier 8', and the outputs of rectifiers 8 and 8' are differentially supplied to meter 9 by means comprising a bridge circuit 11 as described hereinafter. It can be seen from Fig. 1, wherein vectorially $E_D = E_1 - E_2$ and wherein P' is drawn from the tip of vector $E_1$ perpendicular to $E_D$, that $$\sin \tfrac{1}{2}\alpha = \frac{\tfrac{1}{2}E_D}{E_1} \text{ or } E_D = 2E_1 \sin \tfrac{1}{2}\alpha$$

The phase meter 9 measures a quantity linearly proportional to $(E_s - E_D)$; and $$E_s - E_D = 2E_1(\cos \tfrac{1}{2}\alpha - \sin \tfrac{1}{2}\alpha)$$
$$= E_1(\sqrt{2(1+\cos \alpha)} - \sqrt{2(1-\cos \alpha)})$$

Since the phase meter reading is the same for $\alpha$ and 360°−$\alpha$ it is desirable that there be provided a quadrant indicating means, that is, means for determining whether $\alpha$ lies between zero and 180° or between 180° and 360°. Means is provided for this purpose, comprising condensers 12 to 18, of different small capacitance values. Switch 19 can select any one of these condensers for connection of the selected one across the output of the constant output level amplifier 2 through switch 19, contacts of momentarily operated relay 20 and conductor 21. The operation of relay 20 for momentarily closing its contacts is described hereinafter. For the momentary duration of the closure of the contacts of relay 20, the condenser that the manually operated switch 19 has selected for connection across the output of amplifier 2 changes the phase of $E_2$ relative to that of $E_1$ by an angle whose absolute magnitude is about 5°. Consequently, during this momentary period the position of the pointer of the phase meter 9 (and likewise the position of the recording pen of a phase recorder 31 connected in series with meter 9 as pointed out hereinafter) is momentarily changed a slight amount in one direction or the other (from its position with the contacts of relay 20 open) depending on whether $\alpha$ lies between 0° and 180° or 180° and 360°. This up or down direction of the shift in the meter reading (or in the recorder reading) thus determines the quadrant of the phase angle $\alpha$. It is desirable that the shift be small; so the manual switch 19 is provided for selecting that one of the condensers 12 to 18 having the value of capacitance most appropriate to the frequency band in which the phase shift is being measured. As one example, the condensers 12, 13, 14, 15, 16, 17 and 18 may have their respective capacitances, (in microfarads), 0.25, .06, .015, .003, .0006, .00015 and .00004, and may be used respectively for the frequency bands (in kilocycles per second), 0.2 to 0.7, 0.7 to 2, 2 to 10, 10 to 50, 50 to 200, 200 to 800 and 800 to 3,000. However, when $E_2$ is, in a manner described below, swept continuously through the range 0.2 to 3,000 kilocycles per second, a single one of these capacitances may be used.

The system of Figs. 2 and 3 consists of four portions bearing the legends "Input Section," "Gain Section No. 1," "Gain Section No. 2" and "Phase Section."

Input section

In this section is constant output level oscillator 22, with its variable tuning condenser 23 driven by shaft 24. This shaft can be operated manually, or if desired, can be coupled by a clutch or other suitable coupling device 25 to shaft 26 of motor 27. The motor 27 may be a synchronous motor or other constant speed motor. It may sweep the oscillator frequency through the range from 200 cycles per second to 3,000 per second in a period of two minutes, for example. A gain recorder 28 and phase recorder 29 may use paper strip charts (not shown), respectively provided with decibel and phase angle scales. (The circuit connection of the meter movement 30 of the gain recorder is indicated at 30 in Gain Section No. 2; and the circuit connection of the meter movement 31 of the phase recorder is indicated at 31 in the Phase Section.) The strip chart for recorder 28, and likewise that for recorder 29, may be driven at constant speed by a drum (not shown). These drums may be rotated by shaft 26. If desired, by suitable means (not shown), as for example gear shifting means, they may be rotated at a constant low speed or a constant high speed, at will, for a given speed of shaft 26. If desired, the drums may be driven by a common synchronous motor or individual synchronous motors (not shown) separate from motor 27, instead of by motor 27.

Each recorder is equipped with a magnetic printing device which can be used to print time reference marks on the margin of the chart, at a point opposite the recorder pen, while the chart is in motion under the recorder pen, to identify the passing of specific frequencies by thus marking the chart margin at instants at which the frequency of the current supplied to the recorder meter movement has specified values. The magnetic printing device for recorder 28 comprises a solenoid 32 and its plunger 33, and that for recorder 29 comprises a solenoid 34 and its plunger 35. These solenoids may be controlled by any suitable means. For example, they may be controlled by a perforated film (not shown) driven by the synchronous motor associated with the variable frequency oscillator, as described in Felch Patent 2,254,601, September 2, 1941. The control means shown herein as a further example comprises switch 36. This switch 36 is connected in circuit with battery 37, switch 38 and the solenoids 32 and 34, and is operated by shaft 24. With switch 38 closed, the solenoids actuate their plungers 33 and 35 (to mark the chart margins) whenever switch 36 closes one of its contacts. The time-frequency scale of the oscillator 22 over the desired frequency range of the oscillator, when the oscillator is driven by the motor 27, may (for example, by appropriate design of condenser 23) be made of any desired type. For instance, it may be linear, or may be logarithmic.

As indicated above, the sinusoidal signal or test voltage from oscillator 22 is of constant amplitude over the frequency range between 200 cycles and 3 megacycles, for example. It is applied to an energy dividing network comprising resistors 40, 41 and 41' which delivers voltages equal in phase and amplitude to an input attenuator 42 and a resistor 43'. The power delivered to attenuator 42 and that delivered to resistor 43' may be, for example, 1 milliwatt. That is, the input level for these elements may be 0 dbm., (dbm. meaning decibels from 1 milliwatt). The attenuator 42 feeds a resistor 43 across which may be connected a path including the circuit X to be tested. A reference path including conductors 44' may be connected to receive the voltage across resistor 43'. The attenuator 42 has attenuation adjustable over the range from zero to 60 decibels, in steps of 10 decibels. This attenuator increases the gain or loss that can be measured. For example if X has a gain of from 20 decibels to 60 decibels, the attenuator may be set at 20 decibels, in which case the measuring circuit need only measure gains from zero to 40 decibels. Moreover, the amplifier 50 referred to below would be overloaded without the attenuator 42 ahead of it.

With the system designed to cover a gain or loss range of 50 decibels, for example, if the transmission through the circuit X to be tested lies between a loss of 10 decibels and a gain of 55 decibels switches 45 are operated to connect X between resistor 43 and a probe amplifier 50, and switches 45' are operated to connect resistor 43' to a probe amplifier 50' through conductors 44'; but if the transmission through X is a loss between 10 and 50 decibels, the switches 45' are operated to connect X between resistance 43' and amplifier 50', and switches 45 are operated to connect resistor 43 to amplifier 50 through conductors 44, and 151 is connected through leads 167 to 166', also 151' is connected through leads 167' to 166. This is for the purpose of extending the absolute loss which can be measured by the system. For example if X has a loss of 40 to 80 decibels then 40 decibels is put in the attenuator 42 and the measuring set must then measure a range of zero to 40 decibels loss.

The switches 45 are connected to the high impedance grid or input circuit of a vacuum tube which forms the amplifying element of amplifier 50 and which may be housed within a shield or probe (not shown) mounted on a flexible arm (not shown) for the convenience of the user. The probe amplifier input impedance up to about 3 megacycles is approximately that of a $5\mu\mu f$ condenser in parallel with ½ megohm. The output of the probe amplifier feeds through a buffer amplifier tube 51 into Gain Section No. 1. Similarly, switches 45' are connected to feed through a circuit including probe amplifier 50' and buffer amplifier 51' into Gain Section No. 1. Neglecting the transmission and phase shift through X, throughout the frequency range of the test voltage the phase shift frequency characteristic and the shape of the transmission-frequency characteristic should be the same for the two sides of the system, i. e., for the path in which X is connected and the reference path. The gain-frequency characteristic of the two probe and buffer amplifiers may be adjusted to similarity by means of suitable networks (not shown) in the plate circuits of the probe amplifier tubes. The absolute gains may be made equal by means of adjustable grid-biasing resistors (not shown) in the cathode-grid and cathode-anode circuits of the buffer amplifier tubes.

Gain Section No. 1

The purpose of this section is to provide a substantial amount of gain for the two sides or branches of the system and to automatically adjust the output levels of both circuit branches of this section to fall within desirable limits, as for example approximately −3 dbm. and −13 dbm. The reason for limiting the output level range of both branches is that the output meters read and record ranges of only 10 decibels for spread scale easy accurate reading. Each branch contains a broad-band feedback amplifier. These amplifiers, 52 and 52' may be similar to amplifier 59 of Gain Section No. 2 described hereinafter. They may have approximately 30 decibels gain, and should have identical characteristics of gain vs. frequency and load capacity vs. frequency. Small differences in their absolute gain may be corrected by gain adjusting potentiometers (adjustable resistances) connected in the feedback circuit (in the manner in which potentiometer 96 is shown connected in the feedback circuit of amplifier 59 in Fig. 4, described hereinafter). The level control is cared for by two attenuators 53 and 54 in one side of this section and an attenuator 55 in the other side.

The attenuator 55 is used as a manual range selecting switch, with losses of 0, 20 or 40 decibels, to choose the following ranges for the unknown gain to be measured: the zero decibel setting is used when X is to have gains of from 0 to 30 decibels; the 20-decibel setting is used for transmission (through X) of from 20 decibels loss to 10 decibels gain; and the 40-decibel setting is used for losses (through X) of 10 to 40 decibels. The attenuator switches are designated 55a and 55b.

The attenuator 53 is an automatic motor driven attenuator of 0 to 30 decibels in steps of 10 decibels each. It is driven by motor 56, as indicated by the dash lines connecting the motor with the attenuator switches 53a and 53b. The motor operation is under control of polarized marginal relays 57 and 58 whose windings are in series with a gain indicating meter 70 in the output circuit of a gain measuring amplifier rectifier 59 and 60 of Gain Section No. 2 to be described below. A switch 59s connects that amplifier-rectifier to be fed by the amplifier 52 or the amplifier 52', according to whether X is connected to switches 45 or 45'. If the output of rectifier 60 rises above a certain level the relay 57 operates to close a circuit extending from the secondary winding 61 of a power transformer 62 through conductor 63, conductor 64, contacts of relay 57, conductor 65, a limit switch 66, conductor 67, the winding of a relay 68, and conductor 69, to the winding 61. Thereupon, relay 68 operates, causing the motor 56 to drive the attenuator switches 53a and 53b of the attenuator 53 in a clockwise direction to increase the loss by 10 decibels. As a consequence, the level at the input to the gain measuring amplifier 59 in Gain Section No. 2 drops by 10 decibels and the marginal "high" relay releases, deenergizing the winding of the relay 68 and stopping the motor 56.

If the gain measuring amplifier output drops below a certain level the marginal relay 58 releases, closing a circuit that extends from the transformer winding 61 through conductor 63, conductor 64, contacts of relay 58, conductor 71, limit switch 72, conductor 73, winding of relay 74, and conductor 69, to the winding 61. Consequently, relay 74 operates, causing motor 56 to drive the attenuator switches 53a and 53b of attenuator 53, in a counterclockwise direction to decrease the loss by 10 decibels. The increased level thereupon operates the marginal relay 58 to stop the motor. Hunting of the motor is prevented by an adequate spread of marginal relay adjustments. Limit switches 66 and 72 for the motor 56 are driven by the motor, as indicated by the dash line connecting the motor and the switches. The arms of switches 66 and 72 are bridging contacts to assure continuity of current to the relays 68 and 74. The arm of switch 76 is non-bridging so no two of the lamps 75 are operated at the same time. Preferably the arms of switches 53a and 53b are bridging contacts, so that the attenuation does not increase too abruptly.

The attenuator 54 is a 5-decibel pad which can be inserted or removed manually, to shift the reading of the meter 70 nearer to the center of the scale in case a large number of readings happen to fall near either end of the meter range. This can also be used to avoid unnecessary operation of the marginal relays 57 and 58 and associated motor driven attenuator 53.

A lamp indicator comprising a system of nine indicating lamps 75 labeled from 30 decibel gain to 40 decibel loss is provided whereby the resting position of the automatic attenuator 53, and the settings of the attenuators 54 and 55 are all integrated into a net value of gain to be added to the meter reading as a step in determining the gain of circuit X. This value is indicated by lighting the proper lamps. The lamp indication is decibels to be thus added to the meter reading. Losses are expressed as negative gains. Thus a lamp reading of +30 would indicate gain of 30 decibels and −30 would indicate loss of 30 decibels. The lamps are fed from the transformer winding 61 through switches 76, 77 and 78 mechanically connected to the attenuator switches of attenuators 53, 54 and 55, respectively, as indicated by dash lines. The switch 77 lights the +5 decibel lamp whenever the attenuator 54 has its loss inserted between the attenuator 53 and the amplifier 52. The switches 76 and 78, with their interconnections shown in the drawing, control the lighting of the eight remaining lamps in accordance with the table below, only one of these eight lamps burning at any given time. The algebraic sum of the decibels indicated by those of the nine lamps that are burning at any given time is to be added to the decibel reading on the input attenuator 42 and the result is to be added to the decibel reading on the meter 70 at the time, to arrive at the gain or loss of the circuit X.

TABLE

| Attenuator 55 | Attenuator 53 | Lamp Lighted |
|---|---|---|
| 0 | 0 | 0 |
|   | 10 | +10 |
|   | 20 | +20 |
|   | 30 | +30 |
| 20 | 0 | −20 |
|   | 10 | −10 |
|   | 20 | 0 |
|   | 30 | +10 |
| 40 | 0 | −40 |
|   | 10 | −30 |
|   | 20 | −20 |
|   | 30 | −10 |

*Gain Section No. 2*

This section comprises the gain measuring amplifier-rectifier 59 and 60 with output meter 70, and the constant-output-level amplifiers 2 and 2', all referred to above. It also comprises a logarithmic converter or direct current amplifier 80;

including vacuum tube 81, fed by the rectifier 60 and feeding the meter movement 30 of the gain recorder 28.

Fig. 4 shows the amplifier-rectifier circuit 59 and 60 as comprising three amplifier tubes 82, 83 and 84, which may be of R. C. A. type 6AC7, and one rectifier tube 60, which may be of R. C. A. type 6H6. These provide a gain of 30 decibels and linear rectification for the gain indicating meter 70. The meter 70 has a scale calibrated linearly in decibels (graduated uniformly in 1 decibel steps). In series with the meter 70 and constituting part of the output load of the rectifier tube 60 are the windings 57a and 58a of the two polarized marginal relays 57 and 58, referred to above, for controlling the motor driven attenuator 53 in Gain Section No. 1 described above. The relay 57 is adjusted to operate on a current flow corresponding to a reading of 13 decibels on meter 70 and non-operate at a 12 decibel reading. The relay 58 will still hold at a reading of 3 decibels, and will release at 2 decibels.

The input circuit for the amplifier 59 includes a voltage dividing network comprising a series arm 85 and a shunt arm. The series arm is a resistance. The shunt arm has a resistance 86 in series with a circuit 87 comprising capacity inductance and resistance in parallel. This voltage dividing network serves to provide a small amount of attenuation and some transmission-frequency characteristic equalization. The interstage coupling circuits of the amplifier are shown as of the resistance-capacity type. Grid biasing voltages for tubes 82, 83, and 84 are provided by resistors 88, 89 and 90 bypassed by condensers 91, 92 and 93. A resistance 94 between the cathode of tube 82 and ground is common to the control grid, plate and screen grid circuits of tube 82. A resistance 95, between the cathode of tube 84 and ground, is common to the control grid and suppressor grid circuits of this tube and the load circuit (i. e., the circuit through rectifier 60). The voltage drop across resistor 95 due to the load current (i. e., rectifier current) is fed back negatively to the grid circuit of tube 82 by an adjustable feedback resistor 96 connecting resistors 95 and 94. The values of resistors 95 and 94 are low compared to those of resistors 90 and 88, respectively. For example, resistors 95 and 94 may be 10-ohm resistors, resistor 96 may be a 15-ohm resistor, and resistors 90 and 88 may be 150-ohm resistors. A by-pass condenser 97 and a plate direct current supply resistor 98, with a plate direct current supply resistor 99, insure that the only plate alternating current of tube 84 that passes through resistance 95 to produce feedback is the load current (i. e., the current through rectifier 60). A by-pass condenser 100 and screen direct current supply resistor 101 insure that alternating screen current of tube 84 does not pass through resistance 95, and thus they prevent feedback of screen alternating current.

The rectifier 60 comprises two rectifying elements or paths, one having an anode 110 and a cathode 111 and the other having an anode 112 and a cathode 113. The anode 110 and the cathode 113 are connected together. The plate of tube 84 is connected to them through a condenser 114 and an inductance 115 in series. The condenser blocks the direct current component and the inductance serves to provide frequency characteristic equalization.

Elements 111 and 112 are connected through a circuit comprising in series resistances 116 and 117 and condensers 118 and 119. The resistors may be 700-ohm resistors and the condensers may be 2-microfarad condensers, for example. During the positive half cycles of the swing of the plate voltage of tube 84, current flows from that plate through condenser 114 and inductance 115, elements 110 and 111, resistance 116, condenser 118, conductor 120, resistance 95 and condenser 93 to the cathode of tube 84. During the alternate or negative half cycles of the plate voltage swing, current flows from the cathode of tube 84 through condenser 93, resistance 95, conductor 120, condenser 119, resistance 117, elements 112 and 113, inductance 115 and condenser 114 to the plate of tube 84. The resistors 116 and 117 tend to linearize the characteristics of the circuits of the rectifying elements. The charges in condensers 118 and 119 produce across those condensers in series a direct current voltage, causing direct current to flow through relay winding 58a, meter 70 and relay winding 57a. The configuration of the rectifier circuit is such that the rectifier output voltage to be fed back negatively has a symmetrical wave shape. The rectifier provides a substantially linear load impedance across its driving circuit. The capacitance C of condensers 118 and 119 and the resistance R of the circuit connected across them (i. e., the circuit including windings 57a and 58a and meter 70, and a resistor 70a which may if desired be shunted across the meter) preferably are given such values that their time constant RC is very small, so the condensers in combination with the resistance of the relay windings and meter circuit will have negligible integrating action on the voltage across the condensers. This, in conjunction with the large negative feedback, gives the desirable property that the wave shape of the current fed back is substantially a replica of the input to the amplifier-rectifier, and the average value of the meter current is substantially linearly proportional to the average arithmetic magnitude of the current delivered to the rectifier. By way of example, the elements 57a, 58a, 70 and 70a may respectively have resistances of 530 ohms, 550 ohms, 180 ohms and 78 ohms.

The gain recorder 28 is used when the frequency adjusting means of the constant output level oscillator 22 is driven by the motor 27, as for example in sweep measurements. It is desired that the gain scale of the recorder chart (or in other words, the gain scale for the meter movement 30 of the gain recorder) be a linear decibel scale, or have uniformly spaced graduations for indicating gains or losses in terms of decibels. That is, the recorder pen displacement per decibel of gain change should be constant over the gain range of the scale. To obtain this result, the current supplied to the meter movement 30 or moving coil of the meter should be linearly proportional to the logarithm of the current output of the linear rectifier 60. The logarithmic converter or logarithmic voltage amplifier 80 serves to give this proportionality with a satisfactory degree of accuracy.

The tube 81 (of the direct current logarithmic amplifier or logarithmic converter 80) may be of R. C. A. type 6L7. Its cathode is connected to ground through resistors 125, 126, 127 and 128 in series. Connected in series from the plate to ground, or in other words across the plate current supply source, is a voltage divider comprising a resistor 129 and a discharge tube 130 which has the property that the voltage across it is, within certain limits, independent of the current through it. It may be, for example, of R. C. A. type VR105–30. The tube 81 has first, second, third, fourth and fifth grids, arranged in the order named, between its cathode and its plate. The first grid is the control or signal grid 131, next to the cathode. The fifth grid is the suppressor grid, located next to the plate and connected directly to the cathode. The second and fourth grids are connected directly together, and are connected to the positive pole of a source of biasing potential 102 whose negative pole is connected to the cathode. The third grid 132 may be called the screen grid. It is connected to the junction point 133 of elements 129 and 130, so the voltage across 130 is applied as a constant voltage between the screen grid 132 and ground. The second and fourth grids serve to shield the screen grid 132 from the plate.

The output voltage of rectifier 60 (i. e., the voltage between cathode designated 111 and anode designated 112 in Fig. 4) is applied through conductors 134 and 135 across the grid 131 of tube 81 and the junction point 136 of the cathode resistors 127 and 128, a 31,000-ohm resistance 137 being included in the conductor 134 to isolate the rectifier from tube circuit 80 with respect to the high frequency alternating current.

The current to grid 132, i. e., the screen current of the tube 81, is used for the gain recorder meter movement 30 which is connected in series with resistances 141, 142 and 143 between the screen grid 132 and the junction point 145 of cathode resistors 125 and 126. Cathode resistor 127 is adjustable. By adjusting it, the voltage produced across 126, 127 and 128 by cathode current flow therethrough can be given such value, relative to the value of the voltage across discharge tube 130, that the current through meter 30 gives a zero decibel reading of the meter when the voltage output of rectifier 60 is zero.

A block schematic of the logarithmic converter is shown in Fig. 5 and a simplified circuit in Fig. 6. In the following derivation let $g_{ab}$ = gain from "$a$" to "$b$" with voltage on "$c$" held constant.
$g_{cb}$ = gain from "$c$" to "$b$" with voltage on "$a$" held constant.
$S$ = change in gain from "$a$" to "$b$" per unit differential change in voltage on "$c$."
$B$ = change in voltage on "$c$" per unit change in current output at "$b$."

Since the output current is a function of $e_1$ and of $e_2$ or in other words of two independent variables then the changes about the static values of $e_1$, $e_2$ and $i$ can be expanded by a Taylor's series to yield $$\Delta I = \frac{g_{ab}N}{SB} \frac{\left(\frac{\Delta E}{E}\right)}{1+N\left(\frac{\Delta E}{E}\right)}$$

wherein $$N = \frac{SBE}{1+g_{cb}B}$$

$E$ = static or reference steady state voltage, and
$\Delta E$ = variational voltage about the above $E$ so that $e = E + \Delta E$.

It can further be shown by differential equations that through the choice of a right value of $N$ an exponential function is obtained whose curve follows very closely a relation of logarithmic voltage input change versus linear current output change. That is, with such value of $N$ the output current is directly proportional to the logarithm of the voltage input expressed as a ratio with respect to the static or reference voltage E as defined above. If $N$ is chosen as .3 the above relation is obtained with ±.2 decibel for an input voltage range of 16 decibels. In this manner, it is therefore possible to use (in the gain recorder) a meter scale with uniformly spaced divisions for reading gains or losses in terms of decibels. The resistance 143 is adjustable, to adjust to linearity the proportionality of the logarithm of the meter current to the voltage output of the rectifier 60 when making tube replacements.

In Fig. 2, voltage regulator tube 130 and the power supply source indicated by +B take the place of the battery symbols B₁ and B₂ used in Fig. 6 and the resistance R shown in Fig. 6, the equivalent circuit for the gas tube being a battery and a resistance in series and here including the resistance R as well as B₁, where the value of the resistance R is approximately 100 ohms.

The respective values of resistors 125, 126, 127 and 128, 129, 141, 142 and 143 may be, for example, 500 ohms, 2,500 ohms, 5,000 ohms, 47,000 ohms, 20,000 ohms, 7,000 ohms, 1,400 ohms and 5,000 ohms. Resistors 125, 126 and 127 supply biasing voltage for grid 131, and correspond to battery 144 of Fig. 6. Resistor 129 is screen current supply resistor for screen grid 132. Resistors 141, 142 and 143 serve as current limiting resistors and part of a feedback attenuator between the plate of tube 81 and grid 132.

An advantageous feature of the logarithmic converter 80 is that it uses linear properties of the tube 81, rather than depend on a (less readily obtainable and less readily reproducible) non-linear characteristic of the tube, to obtain the desired linear characteristic of the logarithm of the output current through meter 30 versus the input voltage supplied between grid 131 and point 136 from rectifier 60, or the desired logarithmic relation of the output voltage between screen 132 and cathode (or between points 133 and 145) to the input voltage supplied between grid 131 and point 136 from rectifier 60.

As indicated above, to facilitate measurement of the phase difference between the output voltages of amplifiers 52 and 52' these voltages are made to produce two voltages of the same phase difference whose amplitudes are constant and equal to each other. This is accomplished by the two constant output level amplifiers 2 and 2' which are alike, and which have their constant output voltages equal in amplitude. The circuit of one of these amplifiers, for example, amplifier 2, is shown in Fig. 7. The amplifier has input terminals 150 and output terminals 151. It works on the principle of a voltage regulator. It comprises a variable $\mu$ tube 155 having a gaseous regulator tube 156 in its cathode grid circuit, and a backwardly acting control circuit for the tube 155. The latter circuit comprises an amplifier 159 fed from tube 155, a full-wave rectifier 160 fed from amplifier 159, and a direct current amplifier 161 fed from the rectifier and applying between the grid of tube 155 and ground, by a circuit including conductor 162, a direct current voltage which, in the grid cathode circuit of tube 155, opposes the voltage across the tube 156. The tube 155 may be, for example, of R. C. A. type 6AB7. The amplifier 159 may be a stabilized feedback amplifier substantially like the amplifier 59 of Fig. 4. The tube 156 may be the same type as tube 130 in Fig. 2. A constant reference voltage, for example 105 volts, is obtained across tube 156 through which flows the cathode current of tube 155 and a current whose path extends from +B (the positive pole of the space current supply source for tube 155) through a 20,000-ohm resistor 163 and the tube 156, to the grounded negative pole of the space current supply source for tube 155. The direct current amplifier 161 supplies a high voltage less than but nearly equal to the 105 volts of tube 155.

Assuming for instance a momentary rise in the voltage output at terminals 151, this rise in output level of the variable $-\mu$ tube 155 is amplified by amplifier 159 and rectified by rectifier 160. The rectified voltage is amplified (and reversed in sign) by direct current amplifier 161 and the resulting direct current voltage is then used to increase the negative bias of the variable $-\mu$ tube 155 to reduce the gain and thus keep the output level or amplitude constant. In the rectifier circuit, resistances 160a may each be 300 ohms and capacitance 160c may be 2 microfarads, for example. The amplifier-rectifier 159 and 160, with the negative feedback around the amplifier-rectifier circuit, has properties similar to those of the amplifier-rectifier 59—60 pointed out above.

When X is connected in circuit by the switches 45, conductors 165 are to connect terminals 151 to terminals 166 of the Phase Section and conductors 165' are to connect terminals 151' to terminals 166' of the Phase Section; but when X is connected in circuit by switches 45', conductors 167 are to connect terminals 151 to terminals 166' and conductors 167' are to connect terminals 151' to terminals 166.

*Phase Section*

Having obtained at terminals 166 a voltage of constant amplitude bearing the same phase relation to the voltage of equal amplitude at terminals 166' that the output voltage from X bears to the voltage applied to the input of X, then it is desired, in order to measure the phase difference between the voltages of constant equal amplitude, to combine effects of their vector sum and their vector difference, as indicated above. This the Phase Section does.

As pointed out in more detail below, it comprises means comprising resistors 6 and 6' and having a broad transmission frequency band, to combine the voltage from terminals 166 and the voltage from terminals 166' in such manner that their sum and their difference are obtained, broad band amplifier-rectifiers 7, 8 and 7', 8' to rectify the sum voltage and the difference voltage separately, and an output bridge circuit 11 to combine the rectified currents so that their algebraic difference may be read on a meter 9 and may also be recorded on recorder 29 having meter movement 31. The meter 9 and the recorder meter movement 31 are connected in series in a diagonal of the bridge. On both the meter 9 and the recorder a very nearly uniform scale can be employed for phase angles of zero to 180 degrees.

Considering the Phase Section more in detail, it includes the sum resistance 6 and the difference resistance 6' referred to above. Resistance 6 is fed from terminals 166 through resistor 170 and from terminals 166' through resistor 170' to produce across resistor 6 a voltage having a given proportionality to the vector sum of the voltage across terminals 166 and the voltage across terminals 166'. Resistor 6' is fed from terminals 66' through phase inverting tube or circuit 10 and resistor 171 and from terminals 166' through resistor 172' to produce across resistor 6' a voltage having the same proportionality to the vector difference of the voltage across terminals 66 and the voltage across terminals 66', the circuit 10 having its output voltage equal to its input voltage in amplitude but displaced 180 degrees therefrom, over the frequency range through which oscillator 22 sweeps. Circuits 10' and 10 are alike. Resistor 6'' is fed from terminals 166 through resistor 172 and from terminals 166' through circuit 10' and resistor 171' so that the impedance fed from terminals 166 will equal that fed from terminals 166'. Each of the resistors 6, 170, 170', 171, 172', 172 and 171' may be 600 ohms; and 6 and 6' may be 400 ohms.

Included in the Phase Section are also the sum amplifier-rectifier 7 and 8 and the difference amplifier-rectifier 7' and 8', these two amplifier-rectifiers being alike and each having its operating frequency range embrace the frequency range through which oscillator 22 sweeps. The ampliers 7 and 7' may be substantially the same as amplifier 59 shown in Fig. 4, and the rectifiers 8 and 8' may be rectifiers of substantially the type of rectifier 60 shown in Figs. 2 and 4. Thus, the amplifier-rectifier 7 and 8, and likewise the amplifier-rectifier 7' and 8', are stabilized feedback circuits of the type of the amplifier-rectifier 59 and 60. The voltage across the resistor 6 is transmitted through a network 175 and a switch 176 to the sum amplifier 7, and the voltage across resistor 6' is transmitted through a network 175' and switch 176 to the difference amplifier 7'. The networks 175 and 175' are alike. Network 175 gives phase and gains equalization over the frequency band for the circuit of amplifier 7. Network 175' functions likewise with respect to amplifier 7'.

The switch 176 and two resistors 168 and 168' are for checking the relative gains of the sum amplifier-rectifier and the difference amplifier-rectifier. In the normal position of the switch its top contacts are closed and both amplifier-rectifiers are energized. With the bottom contacts closed, the sum amplifier 7 is energized and the difference amplifier 7' has its input terminated by resistor 168'. In the mid-position of the switch, the difference amplifier 7' is energized and the sum amplifier 7 has its input terminated by resistor 168. The gains of the amplifiers are adjusted until the reading of meter 9 is the same for the two latter positions of the switch.

The output of amplifier 7 is rectified by rectifier 8 and the output of amplifier 7' is rectified by rectifier 8'. The direct current output voltage of rectifier 8 appears across condensers 177 and 178 in series and thus is applied to Wheatstone bridge circuit 11, these condensers being included with conductors 179 and 180 in one arm of the Wheatstone bridge. The direct current output voltage of rectifier 8' appears across condensers 177' and 178' in series and thus is applied to bridge 11, these condensers being included with conductors 179' and 180' in the arm 182 of bridge 11 opposite arm 181. The bridge also comprises a resistance arm 183, a like resistance arm 184 opposite 183, a diagonal extending from the junction point 185 of arms 181 and 184 to the junction point 186, arms 182 and 183 and including the indicating phase meter 9 and the meter movement 31 of phase recorder 29 in series, and a diagonal extending from the junction point 187 of arms 183 and 181 to the junction point 188 of arms 182 and 184 and including resistors 189, 190 and 191 in series with each other and in parallel with winding 192 of a control relay 193 referred to hereinafter. Capacitances 177 and 178 may each be 12 microfarads and resistances 183 and 184 may each be 300 ohms, for example.

Resistors 189 and 191 may be 40,000 ohms each. Resistor 190 may be 5,000 ohms. With its adjustable tap, which is connected to ground through a 70,000 ohm adjustable resistance 194, it forms a balancing potentiometer, as indicated below. Connected in series between the bridge corners 185 and 186 are two resistances 195 and 196 of 50,000 ohms each. Their junction point 197 is connected by a conductor 198 to the positive pole of a regulated 300-volt source of direct current 199 whose negative pole is grounded. For simplicity the voltage source 199 is indicated by a battery symbol. The balancing potentiometer 191 and the adjustable resistance 194 are two controls by which there can be obtained complete neutralization of the contact potential voltages of diodes 8 and 8', these elements 191 and 194 being included in a contact potential neutralizing circuit which comprises also the elements 189, 190, 199, 195 and 196. As will be apparent from consideration of Figs. 9 to 11 referred to hereinafter, the potentiometer 194 adjusts the magnitude of the neutralizing voltage and potentiometer 191 balances the bridge so that no current due to the neutralizing circuit flows in meters 31 and 9. Contact potential must be neutralized because it produces a current in the output circuit, meters 31 and 9, which is not proportional (related) to the input signal excitation of the diodes.

Figure 8:
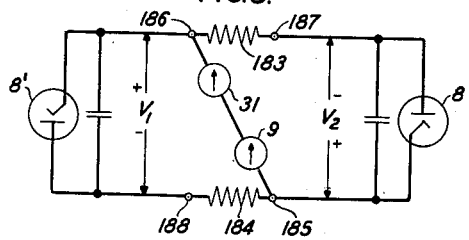
Figs. 8 to 11 are diagrams for facilitating explanation of the operation of a bridge circuit shown in Fig. 3.

Fig. 8 shows the bridge circuit 11 with the contact potential neutralizing circuit omitted, to indicate in a simple way the operation of the bridge circuit to make the current through meter 9 the algebraic difference of the rectified currents from rectifiers 8 and 8'. The diodes 8 and 8' produce rectified voltages designated $V_1$ and $V_2$, respectively, which are in opposition. Currents that these voltages cause to flow through meter 9 are in opposition. The resistance faced by each diode is equal to that faced by the other, so when $V_1=V_2$ the currents through 9 are equal and opposite or in other words, the resultant current through 9 is zero.

Figure 9:
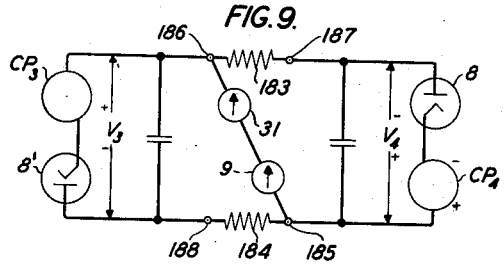

Fig. 9 adds to the circuit of Fig. 8 two voltage sources $CP_3$ and $CP_4$ representing the contact potentials of the rectifiers 8' and 8, respectively. To neutralize the voltages of $CP_3$ and $CP_4$ there must be produced across them voltages $V_3$ and $V_4$, respectively. It is required that the production of $V_3$ and $V_4$ shall not cause current flow through 9. Therefore, 9 is made conjugate to the source 199 used to produce $V_3$ and $V_4$.

Figure 10:
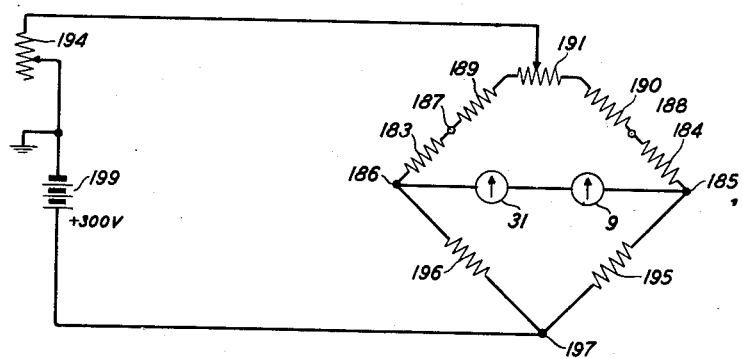

Fig. 10 is the bridge circuit 11 of Fig. 3 redrawn, with 8 and 8' omitted, to indicate this conjugacy in a simple way. Adjustment of the contact movable on resistance 191 is used to achieve the conjugacy (bridge balance).

Figure 11:
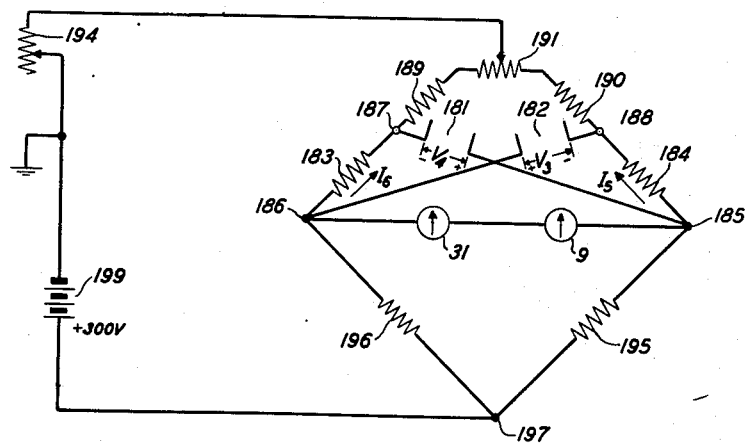

Fig. 11 adds to Fig. 10 the rectifiers 8 and 8', to indicate in a simple way how the required neutralizing voltages $V_3$ and $V_4$ are produced, by currents $I_5$ and $I_6$, respectively, flowing in resistors 184 and 183, respectively, from source 199. With the bridge balanced, so there is no voltage drop across 9 and 31, the voltage $V_3$ is equal to $I_5$ times the resistance of 184 and the voltage $V_4$ is equal to $I_6$ times the resistance of 183. Thus, adjustment of 194 adjusts the magnitude of $V_3$ and $V_4$.

The Phase Section includes a phase angle quadrant indicating means comprising condensers 12 to 18, switch 19 and relay 20 and operating as described above upon each momentary closure of the relay contacts. The quadrant determination may be manual, periodic or transitional in accordance with the manner of operating the relay 20 for producing momentary closures of its contacts. In the manual determination the quadrant is determined at any selected moment or, in other words, at will, by operating a switch 210 as described below. In the periodic determination the quadrant is automatically determined at regular time intervals, specifically at the operating frequency of a low frequency relaxation oscillator 211 as described below. In the transitional determination the quadrant is automatically determined whenever $\alpha$ passes through either zero or 180 degrees by operation of the relay 193 as described below. The periodic determination and the transitional determination are intended for use when making recording types of phase measurements over a wide band of frequencies where it might be desirable to avoid the long attendance of an operator. (The switch 19 is then left in whatever setting may appear most suitable for the frequency range of the test.) The transitional determination is for use when making sweep measurements of phase, with the oscillator 22 motor driven.

Selection of the manual, periodic or transitional determination may be made by the four-position switch 210 whose positions may be called positions 1, 2, 3 and 4, and correspond to closure of its switch arms on contact pairs $P_1$, $P_2$, $P_3$ and $P_4$, respectively. Position 4 is for the periodic determination. In this position of the switch the relay 20 operates in response to and in synchronism with the oscillations of the current generated by the relaxation oscillator 211, whose frequency may be two or three cycles per second, for example. The relaxation oscillator comprises vacuum tubes 215 and 216. Its frequency is determined by the RC time constants of its grid leak resistances 217 and 218 and its coupling capacities 219 and 220. With the switch 210 in its position 4, plate current for tube 215 flows from the positive pole +B of the plate current supply source through switch 210, plate resistor 221 for tube 215, the plate-to-cathode path in the tube, and cathode lead resistor 222, to the grounded negative pole of the plate current supply source. Also plate current for tube 216 flows from +B through switch 210, lamp 223, plate resistor 224 for tube 216, the winding of relay 20, the plate-to-cathode path in tube 216, and the grid bias resistor 225 to ground. The relaxation oscillator then generates low frequency oscillations; and the relay 20 operates and releases in response to and in synchronism with these fluctuations in the plate current of tube 216 to periodically momentarily connect one of the small condensers 12 to 18 across the terminals 66 and thus produce momentary changes in the reading of the phase meter 9 and recorder 31. As pointed out above, these readings will be decreased when $\alpha$ lies between 180 degrees and 360 degrees, and will be increased when $\alpha$ lies between zero and 180 degrees. The lamp 223 serves to show when the phase shift circuit is introduced into the line.

Positions 2 and 3 of the switch 210 are for the manual determination of the quadrant of the phase angle $\alpha$. In the position 2, the switch opens the plate current supply circuits of tubes 215 and 216 so relay 20 is in denergized condition and its contact is open. In position 3 switch 210 closes the plate current supply circuit of tube 216 through lamp 223, resistance 224 and the winding of relay 20 but opens the plate current supply circuit of tube 215 to prevent oscillation of the relaxation oscillator and short-circuits resistor 218 to increase the static plate current of tube 216 to a high enough value for positive operation of relay 20, so the plate current of tube 216 operates relay 20 in this position 3 of switch 210. Thus, each time the switch 210 is operated from position 2 to position 3 and after a moment operated back to position 2, the relay 20 momentarily connects one of the small condensers 12 to 18 across terminals 66.

Position 1 of the switch 210 is for the transitional determination of the quadrant of the phase angle α. In this position of the switch, the circuit of the relaxation oscillation is the same as in position 4, except that the contacts of the relay 192 are inserted in series in the plate current supply circuit of tube 216 so the relaxation oscillator oscillates only while relay 193 is operated. In the position 1 of switch 210, whenever the value of α passes through the region of either zero or 180 degrees, the current through the winding 192 of relay 193 passes through a maximum value whereupon the relays 193 and 20 operate in succession. As the value of α passes from the region of zero or 180 degrees, the relay 193 releases in turn releasing relay 20 and thus completing one cycle of quadrant determination. (The regions mentioned may be some 20 degrees wide.) The reasons why the current through winding 192 is a maximum when α is zero or 180 degrees is as follows: Winding 192 being connected across points 187 and 188 of the bridge, the relay is actuated by the sum diode 8 and difference diode 8' in parallel. Since either the sum or difference output goes to a maximum at zero and 180 degrees, the relay is operated.

What is claimed is:

1. A system for measuring transmission efficiency and phase shift of a path, comprising a wave source of constant output level, an adjustable attenuator, means for supplying a wave from said source to said attenuator and to said path, an adjustable attenuator fed from said path, means for producing from the output waves of said attenuators two waves of the same constant amplitude which have the same phase difference as said two output waves, means for obtaining the sum and difference of said two constant amplitude waves, means for rectifying said sum and difference waves, means for differentially combining the rectified quantities to obtain a resultant quantity, a phase meter responsive to said resultant quantity, and a circuit including a rectifier fed from said second-mentioned attenuator and feeding a decibel meter having a linear scale.

2. A system for measuring transmission efficiency and phase shift of a path, comprising a wave source of constant output level, an adjustable attenuator, means for supplying a wave from said source to said attenuator and to said path, an adjustable attenuator fed from said path, means for producing from the output waves of said attenuators two waves of the same constant amplitude which have the same phase difference as said two output waves, means for obtaining the sum and the difference of said output waves, means for rectifying said sum and difference waves, means for differentially combining the rectified quantities to obtain a resultant quantity, a phase meter responsive to said resultant quantity, a circuit including a rectifier fed from said second-mentioned attenuator and feeding a decibel meter having a linear scale, and means responsive to output from said last-mentioned rectifier for adjusting said second-mentioned attenuator to change the input level to that rectifier in discrete steps of known amount whenever the output level of that rectifier either exceeds or falls below the range of said decibel meter.

3. A system for measuring transmission efficiency and phase shift of a path, comprising a wave source of constant output level, an adjustable attenuator, means for supplying a wave from said source to said attenuator and to said path, an adjustable attenuator fed from said path, means for producing from the output waves of said attenuators two waves of the same constant amplitude which have the same phase difference as said two output waves, means for obtaining the sum and the difference of said output waves, means for rectifying said sum and difference waves, means for differentially combining the rectified quantities to obtain a resultant quantity, a phase meter responsive to said resultant quantity, a circuit including a rectifier fed from said second-mentioned attenuator and feeding a decibel meter having a linear scale, means responsive to output from said last-mentioned rectifier for adjusting said second-mentioned attenuator to change the input level to that rectifier in discrete steps of known amount whenever the output level of that rectifier either exceeds or falls below the range of said decibel meter, and a lamp indicator to facilitate taking into account the resting position of the second-mentioned attenuator and the setting of the first-mentioned attenuator in determining the gain of said path from the reading of said decibel meter, said indicator comprising indicating lamps and means for lighting a selected one of said lamps indicative of the settings of said attenuators for each permutation of said settings, said last-mentioned means comprising switching means linked to said first-mentioned attenuator for operation therewith, switching means linked to said second-mentioned attenuator for operation therewith, and electrical connections between said two switching means and between said lamps and said two switching means.

4. A system for measuring transmission efficiency and phase shift of a path, comprising a wave source of constant output level, an adjustable attenuator, means for supplying a wave from said source to said attenuator and to said path, an adjustable attenuator fed from said path, means for producing from the output waves of said attenuators two waves of the same constant amplitude which have the same phase difference as said two output waves, means for obtaining the sum and the difference of said output waves, means for rectifying said sum and difference waves, means for differentially combining the rectified quantities to obtain a resultant quantity, a phase meter responsive to said resultant quantity, a circuit including a rectifier fed from said second-mentioned attenuator and feeding a decibel meter having a linear scale, means responsive to output from said last-mentioned rectifier for adjusting said second-mentioned attenuator to change the input level to that rectifier in discrete steps of known amount whenever the output level of that rectifier either exceeds or falls below the range of said decibel meter, and means for adding at will a small fixed attenuation to the attenuation introduced by said second-mentioned attenuator between said source and said last-mentioned rectifier.

5. The method of comparing the phases of two waves of the same constant amplitude, the same frequency and variable phase difference which may exceed 180 degrees, which method comprises separately rectifying the sum and difference of the two waves, differentially combining the rectified quantities to ascertain the phase difference relative to 180 degrees, and periodically momentarily changing the phase difference between said waves a small fixed amount of fixed sign, in order to ascertain whether the phase difference is above or below 180 degrees.

6. The method of comparing the phases of two waves of the same constant amplitude, the same frequency and variable phase difference which may exceed 180 degrees, which method comprises separately rectifying the sum and difference of the two waves, differentially combining the rectified quantities to ascertain the phase difference within a range between zero and 180 degrees, and upon each passage of the phase difference through the region of zero or 180 degrees momentarily changing the phase difference between said waves a small fixed amount of fixed sign in order to ascertain the difference over a range from zero to 360 degrees.

7. A system for measuring phase difference between two waves, comprising two like amplifiers responsive to change in amplitude of two sine waves of equal frequency but different phase for rendering their amplitudes constant and equal while retaining their sine wave form, means for producing their sum and their difference, means for producing a first unidirectional voltage proportional to said sum, separate means for producing a second unidirectional voltage proportional to said difference, a bridge circuit comprising four impedance arms and two diagonals, a source of direct current connected in one of said diagonals, a utilization circuit including a device responsive to direct current connected in the second of said diagonals, means for applying said first unidirectional voltage between one end of said second diagonal and a point on one of said arms between the ends of said one arm, and means for applying said second unidirectional voltage between the other end of said second diagonal and a point on a second of said arms between the ends of said second arm, said second arm being an arm adjacent to said one arm and having one end at said one end of said second diagonal, and said first and second unidirectional voltages being poled to send currents in opposite directions through said device.

8. A system for measuring transmission efficiency and phase shift of a path, comprising a wave source of constant output level, an adjustable attenuator, means for supplying a wave from said source to said attenuator and to said path, means for producing from the output waves of said attenuator and said path two waves of the same constant amplitude which have the same phase difference as said two output waves, means for obtaining the sum and difference of said two constant amplitude waves, means for rectifying said sum and difference waves, means for differentially combining the rectified quantities to obtain a resulting quantity, a phase indicating meter responsive to said resulting quantity, a circuit including a rectifier fed from said path, a vacuum tube having a plate, a cathode, and first, second, third and fourth grids arranged in the order named between the cathode and the plate with the first grid next to the cathode, a circuit for supplying to said first grid and said cathode unidirectional voltage from said last mentioned rectifier, means for supplying to said plate a potential positive with respect to said cathode, means for supplying to said third grid a constant positive potential with respect to said cathode, means for supplying to said second and fourth grids a given potential positive with respect to said cathode, and a current responsive meter connected between said cathode and said third grid and having a linear decibel scale.

9. A system for measuring transmission efficiency and phase shift of a path, comprising a wave source of constant output level, an adjustable attenuator, means for supplying a wave from said source to said attenuator and to said path, an adjustable attenuator fed from said path, means for producing from the output waves of said attenuators two waves of the same constant amplitude which have the same phase difference as said two output waves, means for obtaining the sum and difference of said two constant amplitude waves, means for rectifying said sum and difference waves, means for differentially combining the rectified quantities to obtain a resulting quantity, a phase indicating meter responsive to said resulting quantity, an amplifier fed from said path, a rectifier circuit having two branches with common terminals, each of said branches comprising a rectifying element and a linear impedance in serial relation, said impedances being connected together at one of said terminals and said rectifying elements being pointed in opposite directions between said terminals, a circuit connected across said impedances including a decibel meter having a linear scale, and means for feeding waves from said amplifier to said rectifier and producing negative feedback through said rectifying elements to said amplifier.

10. A system comprising two like amplifiers responsive to change in amplitude of two sine waves of equal frequency but different phase for rendering their amplitudes constant and equal while retaining their sine wave form, means for obtaining the sum and the difference of the resulting sine waves of constant equal amplitudes, separate means for producing unidirectional forces proportional to said sum and difference waves, respectively, and means for differentially combining the unidirectional forces, each of said amplifiers comprising a cathode-grid circuit including a gas tube, means for maintaining a constant voltage of given sign across said gas tube, a backwardly acting control circuit for said amplifier including a rectifier fed from said amplifier and a circuit connecting said rectifier and said cathode-grid circuit for producing in said cathode-grid circuit a voltage opposing said constant voltage.

11. A system for comparing the phases of two substantially pure sine waves of equal frequency comprising separate repeating means for each of said waves, each of said means including volume control means whereby the output amplitude of the respective wave repeating means is independent of its input amplitude, each said means being substantially distortionless, and both said means being adjusted to substantially the same output amplitude, whereby the respective repeated waves are substantially equal in amplitude and have a phase difference related to the phase difference of the original waves, means for obtaining the sum and the difference of said two repeated waves, separate means for producing unidirectional forces proportional to the sum and difference respectively, and means for differentially combining the unidirectional forces, whereby the phase difference between the original waves is indicated.

12. A system comprising a source of substantially pure sine waves, a reference transmission path, a transmission path to be measured, means to impress waves from said source upon each of said transmission paths, said paths being subject to differences in transmission loss and in phase shift, separate wave repeating means in each of said paths, each of said means including volume control means whereby the output amplitude of the respective wave repeating means is independent of its input amplitude, each said wave repeating means being substantially distortionless and both being adjusted to substantially the same output amplitude, whereby there are produced two repeated sine waves of the same frequency and amplitude differing in phase by an amount determined by the difference of the phase shifts in the two aforesaid transmission paths, means for obtaining the sum and the difference of said two repeated sine waves, separate means for producing unidirectional forces proportional to the respective amplitudes of said sum and difference waves and means for differentially combining the unidirectional forces, for indicating the difference in phase shift between the two transmission paths.

13. A system comprising a source of substantially pure sine waves adjustable as to frequency over a relatively wide frequency band, a reference transmission path, a transmission path into which may be inserted a circuit to be measured, means to impress waves from said source upon each of said transmission paths, separate wave repeating means coupled to the output of each of said paths, each of said means including volume control means whereby the output amplitude of the respective wave repeating means is independent of its input amplitude, each said wave repeating means being substantially distortionless and both being adjusted to substantially the same output amplitude, whereby there are produced two repeated waves of the same frequency and same amplitude differing in phase by an amount determined by the phase shift in the circuit to be measured, means for obtaining the sum and the difference of said two repeated waves, separate means for producing unidirectional forces proportional to the respective amplitudes of said sum and difference waves, and means for differentially combining the unidirectional forces, for indicating the difference in phase shift in the two transmission paths, all parts of said system having linear transmission characteristics and having their respective transmission bands as broad as the frequency band over which the source of waves is variable, whereby the sum and difference waves are substantially pure sine waves and a strict proportionality is maintained between the phase shift difference to be measured and the indication thereof as produced by the system.

14. A system in accordance with claim 13 together with means for sweeping the frequency of the impressed waves through the frequency band at a relatively rapid rate.

15. A system for comparing the phases of two substantially pure sine waves of equal frequency comprising separate repeating means for each of said waves, each of said means including volume control means whereby the output amplitude of the respective wave repeating means is independent of its input amplitude, each said means being substantially distortionless, and both said means being adjusted to substantially the same output amplitude, whereby the respective repeated waves are substantially equal in amplitude and have substantially the same phase difference as the original waves, means for combining said repeated waves, and means for indicating the amplitude of the combined wave, whereby the phase difference between the original waves is determined.

EDWARD W. HOUGHTON.

REFERENCES CITED

The following references are of record in the file of this patent:

UNITED STATES PATENTS

| Number | Name | Date |
|---|---|---|
| 1,586,533 | Peterson | June 1, 1926 |
| 2,003,428 | Cowan | June 4, 1935 |
| 2,076,499 | Grant | Apr. 6, 1937 |
| 2,267,820 | Droz | Dec. 30, 1941 |
| 2,281,995 | Purington | May 5, 1942 |
| 2,314,851 | Barney et al. | Mar. 23, 1943 |
| 2,341,937 | Maynard | Feb. 15, 1944 |
| 2,349,261 | Ginzton | May 23, 1944 |
| 2,368,551 | Labin | Jan. 30, 1945 |
| 2,395,515 | Stoller | Feb. 26, 1946 |
| 2,415,468 | Webb | Feb. 11, 1947 |
| 2,416,310 | Hansen et al. | Feb. 25, 1947 |
| 2,451,021 | Detuno | Oct. 12, 1948 |
| 2,467,361 | Blewett | Apr. 12, 1949 |